April 16, 1935.                    W. TIDDY                    1,997,757
                SATURATOR FOR THE PRODUCTION OF AMMONIUM
                SALTS AND PROCESS FOR MAKING SUCH SALTS
                          Filed Aug. 15, 1931
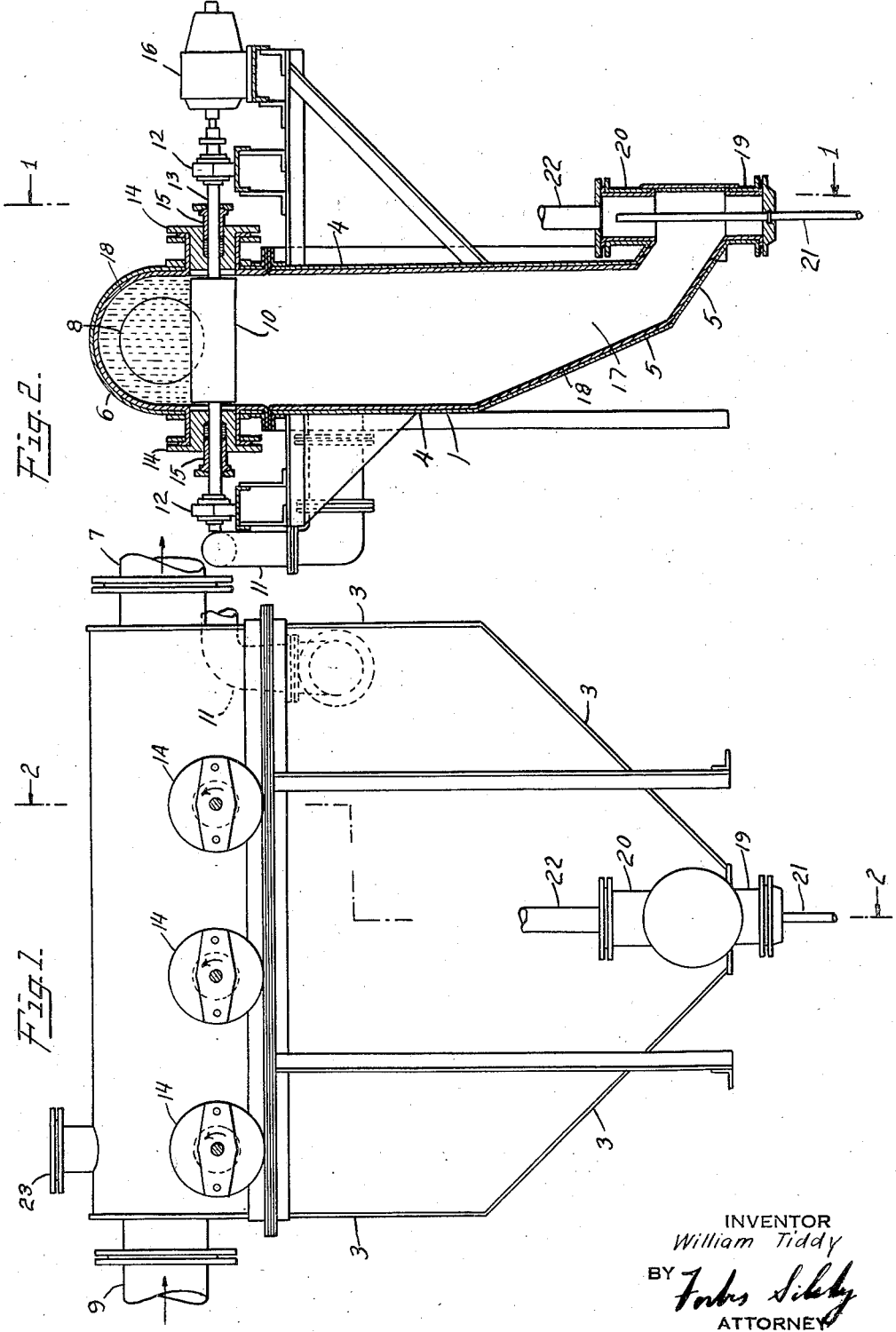
INVENTOR
William Tiddy
BY Forbs Sibly
ATTORNEY Patented Apr. 16, 1935

1,997,757

UNITED STATES PATENT OFFICE 1,997,757

SATURATOR FOR THE PRODUCTION OF AMMONIUM SALTS AND PROCESS FOR MAKING SUCH SALTS

William Tiddy, Scarsdale, N. Y., assignor to Semet-Solvay Engineering Corporation, New York, N. Y., a corporation of New York Application August 15, 1931, Serial No. 557,344

15 Claims. (Cl. 23—119)

This invention relates in general to a process and apparatus for mixing gaseous and liquid media, and in particular to a process for the absorption of ammonia from ammonia-containing gases, and an improved spray-roll saturator for the same.

The preparation of ammonium salts, particularly of ammonium sulfate in crystalline form as heretofore carried out has been attended with numerous difficulties. Heretofore the complete absorption of ammonia gas in liquid media, particularly acids, has been difficult due to the temporary formation of saturated layers at the interface of liquid and gas, a condition retarding the rate of solution of the gas. A further disadvantage of known types of ammonia saturators resides in the fact that the salt crystals produced in such saturators are usually small in size. The small size of the crystals hinders their complete separation from the mother liquor. Further, a mass of small crystals presents such a large surface area to washing fluids that a substantial amount of the crystalline mass is lost in purification processes involving washing. Further, the removal of mother liquor from a mass of small crystals by centrifuging is obviously accomplished only with the expenditure of much time and power and frequently with the loss of a substantial amount of the crystalline mass.

It is an object of this invention to provide an apparatus which shall effect the substantially complete removal of ammonia from gas containing the same by contacting such gases with a spray of acid produced by rotating a cylindrical surface in tangential contact with the surface of a body of an acid liquor.

Another object of this invention is to provide an apparatus designed to effect the production of ammonium salts in crystalline form and to promote the growth of the salt crystals in order to facilitate the separation of such crystals from the mother liquor.

Another object of this invention is to provide an apparatus for the recovery of ammonia from gas which is designed to prevent the establishment of back-pressure on the stream of gas.

It is a further object of this invention to provide a process for the production of ammonium salts from an ammonia-containing gas and a fine spray of a solution containing an acid.

It is an additional object of this invention to provide a process for preparing ammonium sulfate in the form of relatively large crystals, which may be easily and substantially completely separated from the mother liquor.

In accordance with my invention an acid is dispersed as a fine spray by revolving a cylindrical surface about a substantially horizontal axis and substantially in tangential contact with the surface of an acid liquid. The spray of finely dispersed liquid may be contacted with a suitable ammonia-containing gas in such a manner that the sprayed liquid containing dissolved ammonium salts is continuously returned to the main body of liquid in the reservoir. The liquid reservoir is of such dimensions that the crystals of the ammonium salt, after their formation, are maintained in contact with the extended body of liquor saturated with the ammonium salt for a relatively long period of time, thus effecting a substantial growth of the crystals and facilitating their subsequent separation from the mother liquor.

I have discovered that ammonium sulfate crystals of large size may be produced by the use of my improved ammonia saturator which effects the absorption of ammonia from ammonia-containing gases in a solution containing sulfuric acid and the maintenance of the ammonium sulfate thus produced in contact with an extended body of sulfuric acid saturated with ammonium sulfate for a long period of time.

For a fuller understanding of the nature and objects of the invention, reference should be had to the drawing accompanying this specification, showing one form of my improved ammonia-saturator, in which, Fig. 1 is a side elevation of my improved spray apparatus taken on the line 1—1 of Fig. 2; and Fig. 2 is an end elevation and section of the spray apparatus taken on the line 2—2 of Fig. 1.

In the drawing, with special reference to Fig. 2, my improved apparatus comprises a casing 1 formed by downwardly converging end walls 3 of substantial length, side walls 4 also of substantial length, one of which side walls may converge toward the other to form a bottom 5, the end walls 3 and side walls 4 defining a relatively high narrow chamber for maintaining an extended body of liquid therein as more fully described hereinafter. The casing is provided with a cover member 6 adapted to be readily removed to allow access to the interior of the casing, the cover member defining a spray chamber 8 disposed directly above casing 1. An inlet 7 is provided in one end of chamber 8 for gas entering the spray chamber, and an outlet 9 is provided in the opposite end for the exit of the gas after its passage through the spray chamber. Spray rolls 10 are rotatably mounted adjacent the bottom of the spray chamber 8 and the top of the body of liquor in container 1. Shaft 13 of the spray roll, positioned substantially horizontal and journaled in suitable bearings 12 and passing through bearing sleeve 14 provided with packed gland 15, are driven by any suitable means, such as by electric motors 16 the armature shafts of which may be integral with or connected to the shafts 13 of spray rolls 10.

A body of liquid, such as an absorbent, is maintained in reservoir 17 at a constant level by known means, such as an overflow device 11 communicating with the body of liquid in the reservoir 17 at a point below the horizontal axes of the spray rolls. The surface of the liquid in container 1 is thus maintained at a substantially constant level in tangential contact with the spray rolls. By maintaining the surface of the rolls in tangential contact with the surface of the liquid in container 1 a spray above the liquid is formed without substantial agitation of the body of the liquid.

At the bottom of the casing means for discharging the absorbent containing absorbed and suspended bodies may comprise, for example, inlet 19 carrying a steam or vapor injector pipe 21 and an outlet 20 carrying a discharge pipe 22. Discharge pipe 22 communicates with a sludge box or tank (not shown) which separates the crystals from the mother liquor. The recovered absorbent or mother liquor is preferably returned to the body of absorbent near the top thereof, or it may be returned through the spray chamber, for example, by means of inlet 23. The inlet for fresh acid or mother liquor containing the same is so positioned with respect to the spray rolls that the fresh acid is sprayed as quickly as possible after being charged into the reservoir and before substantial dilution of the fresh acid by the liquor contained in the reservoir has occurred. The apparatus of my invention may be made of any suitable corrosive-resistant material or of corrosible material if such material is protected by means of a suitable lining 18 of non-corrosible material, for example, lead.

While my invention contemplates an apparatus comprising a plurality of cylinders positioned horizontally with respect to their longitudinal axes and arranged in parallel, in combination with a reservoir of relatively large dimensions, it will be obvious that my apparatus may comprise a single cylinder in combination with such a reservoir. The cylinder may be of any desired dimension but I prefer to use a cylinder having a diameter of about 6 inches. The rotatable cylinder may be perforated, in which case I prefer to employ a hollow cylinder perforated with a large number of relatively small holes. Or, if desired, a rotatable cylinder made up entirely of wire screen or a roll composed of a plurality of discs may be employed in my improved saturator. I prefer to use an independent driving element for each cylinder, however, I may employ a single driving element to operate a plurality of cylinders.

While a spray chamber of any desired shape and dimension may be employed in combination with a suitable rotatable cylinder, I prefer to employ a spray chamber or hood having an arched or curved ceiling and of a width substantially equal to the length of the cylinder and of such height that, when the cylinder is throwing a uniform spray, the spray will completely fill the spray chamber. The curved or arched ceiling of the spray chamber promotes the quick return to the reservoir of the sprayed liquid.

I have found that the growth of crystals is promoted if a liquid reservoir is employed of such dimensions that an extended body of liquid may be contained in the same. While efficient growth of crystals according to my improved process may be achieved by having the reservoir extended primarily with respect to either a horizontal axis or a vertical axis, I prefer to employ a reservoir having substantial extension with respect to a vertical as well as to a horizontal axis.

In the preferred form of my apparatus the discharging means associated with the acid reservoir and adapted to discharge an acid liquor containing suspended salt crystals is so positioned with respect to the point of entry or formation of the ammonium salt crystals in the acid liquor that crystals passing to the discharging means through the body of acid liquor undergo a substantial growth before being discharged from the reservoir. Furthermore, as appears from Figs. 1 and 2, the mechanism for effecting discharge of the crystals is disposed to one side (to the right, viewing Fig. 2) of the deep body of acid-containing liquid. Hence, steam or vapor blown through ejector pipe 21 to effect the discharge of the crystals will not cause substantial agitation of the deep body of acid-containing liquid.

By removing the solid reaction products substantially at the base of the reservoir, the crystals are thus permitted to remain in contact with a solution of acid saturated with the same for an extended period of time. Crystals produced in the spray and in the upper portion of the liquid body are usually of relatively small dimensions, however, by the time such crystals have reached the discharge means associated with the reservoir, they are found to be materially increased in size due to long continued contact with the saturated mother liquor, which as hereinabove pointed out is not agitated either by the spray producing rolls or the crystal discharge mechanism. Accordingly my improved apparatus is particularly applicable for the production of salts in a solid form, comprising crystals of relatively large size.

As an example of the preferred modification of the process of my invention and of the operation of my improved saturator, reference should be had to the following detailed example.

For the preparation of ammonium sulfate from ammonia-containing gas and a liquid containing sulfuric acid, reservoir 17 may be filled with an aqueous solution of sulfuric acid and the level of the liquid maintained substantially constant and in tangential contact with the hollow perforated rolls 10 by feeding fresh sulphuric acid, mother liquor, or both to the reservoir in amounts somewhat greater than the amount of liquor sprayed by the spray rolls into the gas stream and withdrawn with the crystals from the base of reservoir 17. The cylinders are rotated at such a speed that the acid liquid is continuously carried out of the body of liquid and centrifugally discharged from the cylinder as a fine spray completely filling the annular space enclosed by the spray chamber 8. An ammonia-containing gas, for example coke oven gas or other gas containing the same, may be introduced into the spray chamber by means of gas inlet 7 and contacted with the spray. Due to the extended gas-liquid interface existing in the mixture of spray and gas, the absorption of ammonia proceeds rapidly to completion. The resulting ammonia-free gases may be exhausted from the spray chamber through nozzle 9. The reaction of the ammonia with sulfuric acid and water in the sprayed liquor results in the formation of ammonium sulfate. The sprayed liquor containing ammonium sulfate, both dissolved and crystalline, drips down the side of the spray chamber and is returned to the main body of liquid in the reservoir, which liquid thus becomes slowly saturated with ammonium sulfate. The ammonium sulfate crystals, after formation, remain in contact with the saturated solution of the same for a long period of time owing to the extended body of liquid provided by the use of the large reservoir 17 and further owing to the position of the discharge means associated with the reservoir. This condition results in a substantial growth of the crystals of ammonium sulfate. The solution of sulfuric acid containing ammonium sulfate, both as dissolved and solid salt, may be discharged from the base of the reservoir, for example, by ejecting the solution through pipe 22 by blowing in steam through pipe 21.

The liquor is then passed to a suitable separating device, for example, a centrifuge, wherein the crystalline ammonium sulfate is freed from liquor. The centrifuged liquor may be mixed with fresh sulfuric acid to restore the concentration of sulfuric acid to its original value and the concentrated liquor returned to the reservoir at any convenient point, preferably through an inlet provided near the base of the spray rolls 10 or through inlet 23 provided in the top of the spray chamber 8.

The process of my invention likewise is adapted to the production of ammonium salts other than ammonium sulfate. For example, by charging reservoir 17 with a solution containing phosphoric acid and passing an ammonia-containing gas through the spray chamber, I may prepare ammonium phosphate substantially as in the manner above described for the preparation of ammonium sulfate.

Further, the invention herein disclosed is applicable to the production of salts other than ammonium salts from the basic and acid constituents thereof, by contacting one of the constituents of said salt in the gaseous phase with a spray of a liquid containing the other constituents. For example, I may employ a gas containing acid anhydrides such as sulfur dioxide, carbon dioxide, etc. and contact such a gas, which may be a coke oven gas, with a spray of an aqueous solution of an alkaline compound such as sodium hydroxide.

It will be observed that when a flowing stream of gas is passing through the spray chamber of my improved saturator, the stream is contacted with a fine spray of acid which establishes substantially no resistance to the flow of the gas. Accordingly the apparatus of this invention may be advantageously associated with a gas generator or coke oven and used for the recovery of gaseous constituents from the make gases thereof. The use of this apparatus obviates the difficulties of forcing a gas stream through a liquid seal as required in bell or other known saturators.

Since certain changes in carrying out the above process and in the constructions set forth which embody the invention may be made without departing from its scope, it is intended that all matter contained in the above description and shown in the accompanying drawing shall be interpreted as illustrative and not in a limiting sense.

I claim:

1. In an ammonia saturator, the combination with a spray-roll for producing a fine spray of liquid and a spray chamber enclosing said roll and arranged to contact an ammonia-containing gas with said spray, of a liquid reservoir and means associated with said reservoir for discharging liquid containing suspended crystals therefrom, said reservoir having dimensions such that crystals charged into the upper portion of a body of liquid contained in said reservoir will travel through an extended body of liquid before being discharged therefrom.

2. In an ammonia saturator, the combination which comprises a liquid reservoir, a spray chamber positioned above said reservoir, a spray roll rotatable in tangential contact with a body of liquid contained in said reservoir, means for passing a gas through said spray chamber and discharging means positioned in said reservoir at such a point that crystals produced in the liquid contained in said reservoir will undergo a substantial growth before being discharged therefrom.

3. In an ammonia saturator, the combination which comprises an acid reservoir, a spray chamber positioned above said reservoir, a cylinder positioned in tangential contact with liquid contained in said reservoir, means for revolving said cylinder at such a speed that acid contained in said reservoir will be dispersed as a fine spray, means for passing ammonia in contact with said spray, and means for discharging acid containing suspended crystals from said reservoir, said discharging means positioned in said reservoir at such a point that crystals of an ammonium salt produced in said reservoir will undergo a substantial growth before being discharged therefrom.

4. In an ammonia saturator, the combination which comprises a relatively deep acid reservoir, a spray chamber positioned above said reservoir arranged to direct sprayed liquid downward, a hollow perforated cylinder rotatable about a horizontal axis, means for maintaining the acid in said reservoir in tangential contact with said cylinder, means for revolving said cylinder at such a speed as to disperse said acid as a fine spray, means for passing ammonia gas through said spray chamber into contact with said spray, and means for discharging acid containing suspended crystals of an ammonium salt from said reservoir, said discharging means positioned near the base of said reservoir so that crystals of the ammonium salt charged into said reservoir by said spray will undergo a substantial growth before being discharged therefrom.

5. An ammonia saturator comprising a relatively high chamber containing a relatively deep body of liquid, means for maintaining a substantially constant level of liquid in said chamber, a spray roll rotatably mounted in the vicinity of the top of said chamber with its surface in substantially tangential contact with the surface of said liquid, a casing enclosing said spray roll and providing a gas space thereabove, said casing having a gas inlet and a gas outlet for introduction and discharge of gas respectively into and from said casing, the gas in its passage through said gas space being intimately contacted with said spray created by the rotation of said roll, and an exit port in the vicinity of the base of said chamber.

6. In an ammonia saturator, the combination which comprises a plurality of cylinders positioned parallel with respect to their longitudinal axes, a spherical shaped spray chamber enclosing said cylinders, said spray chamber having its longitudinal axis transverse to the horizontal axis of said cylinders, an acid reservoir positioned below said spray chamber, means for maintaining a relatively deep body of acid in said reservoir in tangential contact with said cylinders, means for rotating said cylinders at such a speed as to disperse the acid as a fine spray, means for passing a gas through said spray chamber into contact with said spray, and means for discharging a liquid containing suspended crystals from said reservoir, said discharging means positioned in said reservoir at such a point that crystals produced in said reservoir will undergo a substantial growth before being discharged therefrom.

7. In an ammonia saturator, the combination which comprises a reservoir adapted to contain a body of acid liquor through which ammonium salt crystals are adapted to be passed, a spray chamber positioned above said reservoir and arranged to charge a sprayed liquor containing ammonium salt crystals into the liquor contained in said reservoir, and crystal discharge means associated with said reservoir, said discharge means being so positioned with respect to the point of charge of the ammonium salt crystals into said liquor, that crystals passing through said liquor undergo a substantial growth before discharge from said reservoir by said discharging means, and also being positioned to one side of said body of acid liquor to avoid agitating the body of acid liquor and thus interfering with the growth of said crystals.

8. A process for the preparation of salts from the basic and acid constituents thereof, which comprises contacting one of the constituents of a salt in the gaseous phase with a spray of a liquid containing the other constituent of said salt, said spray being of the type obtainable by rapidly rotating a cylindrical surface maintained substantially in tangential contact with a body of said liquid.

9. A process for the preparation of ammonium salts from ammonia and an acid, which comprises contacting ammonia in the gaseous phase with a fine spray of said acid, said spray being of the type obtainable by rapidly rotating a cylindrical surface maintained substantially in tangential contact with a body of said acid.

10. In a process for the preparation of an ammonium salt, the steps which comprise absorbing ammonia in a spray of an acid-containing liquid, introducing the spray containing the absorbed ammonia into an extended body of said liquid without causing substantial agitation of said body of acid-containing liquid, maintaining the products of reaction of the ammonia with the acid in contact with said body of liquid for such a time that crystals produced in said liquid will undergo a substantial increase in size, and withdrawing such large crystals from said extended body of liquid without substantially agitating said body of liquid.

11. In a process for the preparation of ammonium salt, the steps which comprise dispersing a solution of sulfuric acid as a spray, contacting said spray with an ammonia-containing gas whereby crystals of ammonium sulfate are produced in said spray, introducing said spray containing ammonium sulfate crystals into an extended body of said acid saturated with ammonium sulfate, causing the ammonium sulfate crystals to contact therewith for such a time that the crystals will undergo a substantial increase in size and withdrawing such large crystals from the said body of acid without substantially agitating said body of acid.

12. In a process for the preparation of ammonium salt, the steps which comprise maintaining an extended body of an acid-containing liquid, rotating a cylinder in tangential contact with the surface of said liquid maintained at a substantially constant level at such a speed as to disperse said liquid as a fine spray, contacting ammonia gas with said spray, returning the sprayed liquid to said extended body of said liquid, and maintaining the products of reaction of ammonia with the acid in contact with said liquid for such a time that crystals produced in said liquid will undergo a substantial increase in size.

13. In a process for the preparation of ammonium salt, the steps which comprise maintaining an extended body of a liquid containing sulfuric acid, rotating a cylinder in tangential contact with said liquid at such a speed that said liquid will be dispersed as a fine spray, contacting said spray with a stream of an ammonia-containing gas whereby ammonium sulfate is formed, returning the sprayed liquid containing the ammonium sulfate to said body of liquid, maintaining the ammonium sulfate in contact with said liquid for such a time that crystals of said ammonium sulfate produced in said liquid will undergo a substantial increase in size, and separating ammonium sulfate crystals from said liquid.

14. In a process for the preparation of ammonium salt, the steps which comprise maintaining an extended body of an acid-containing liquid, rotating a cylinder in tangential contact with the surface of said liquid at such a speed as to disperse said liquid as a fine spray, contacting ammonia gas with said spray, whereby crystals of an ammonium salt are produced in said spray, charging the sprayed liquid containing said crystals into said body of liquid and discharging said crystals at such a point in said body of liquid that the crystals passing through the body of liquid will undergo a substantial growth before being discharged from said liquid.

15. In a process for the preparation of an ammonium salt, the steps which comprise maintaining a relatively deep body of acid-containing liquid, producing a spray of said acid-containing liquid above said body of liquid without causing substantial agitation of said deep body of liquid, absorbing ammonia in said spray to produce an ammonium salt, causing crystals of said salt thus formed to pass through said deep body of acid-containing liquid to cause the ammonium salt crystals to undergo a substantial increase in size, and withdrawing such large crystals from the body of acid-containing liquid while avoiding substantial agitation of said deep body of acid-containing liquid.

WILLIAM TIDDY.